June 14, 1966  G. WINTRISS  3,256,400
MAGNETIC SWITCH
Filed Oct. 10, 1962  2 Sheets-Sheet 1
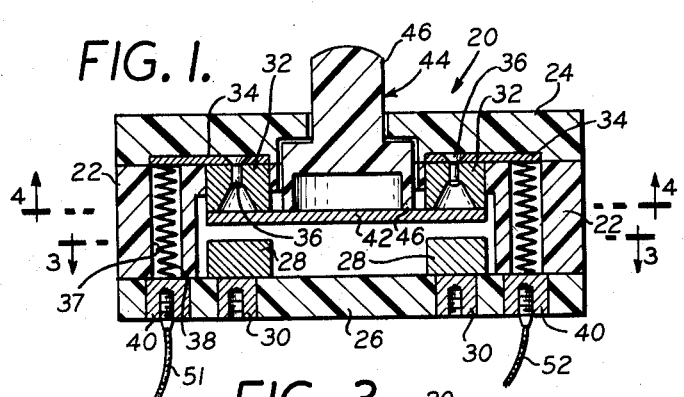
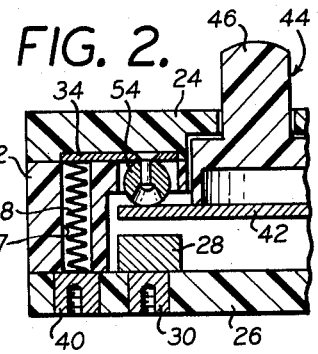
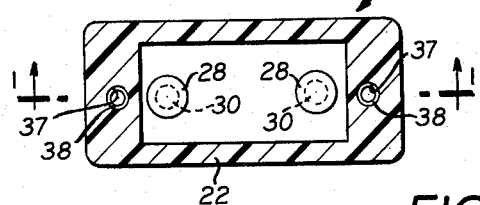
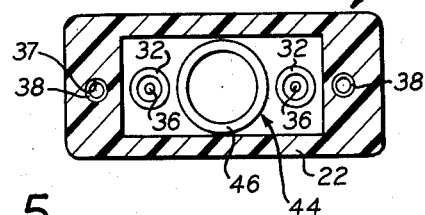
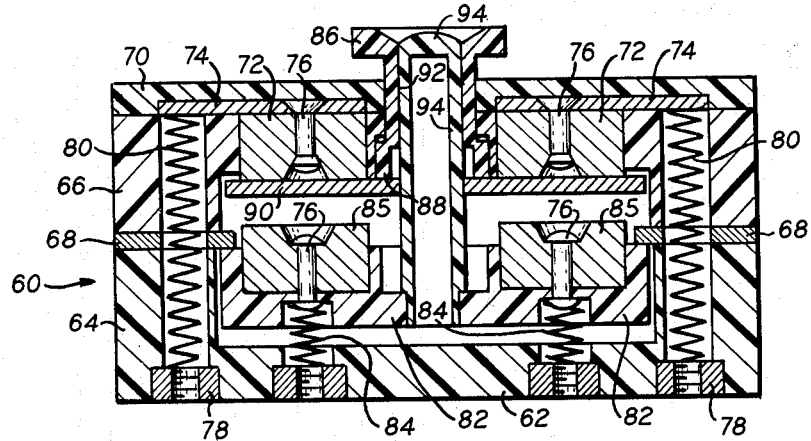
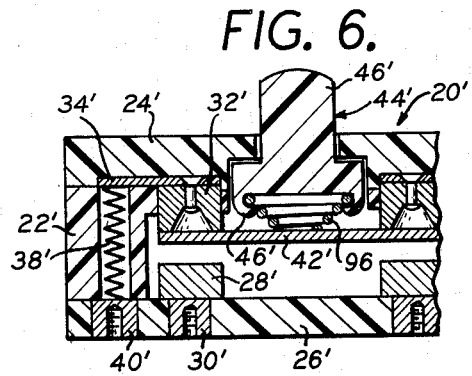
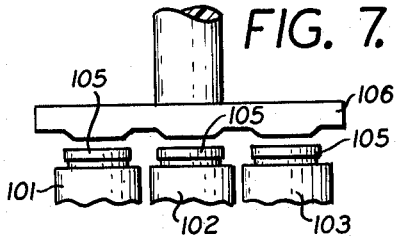
INVENTOR
George Wintriss
BY Emery, Whittemore,
Sandoe & Graham
ATTORNEYS.

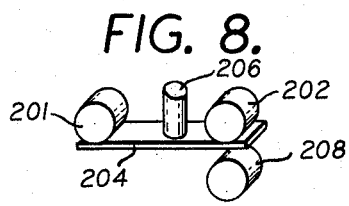
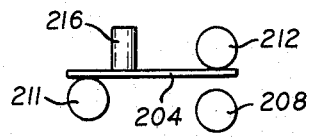
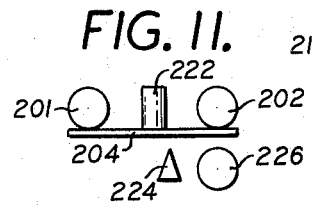
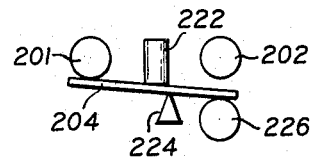
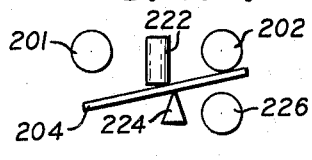
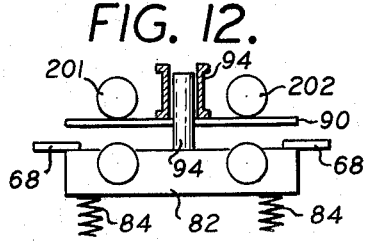
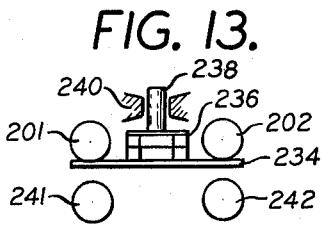
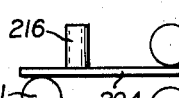
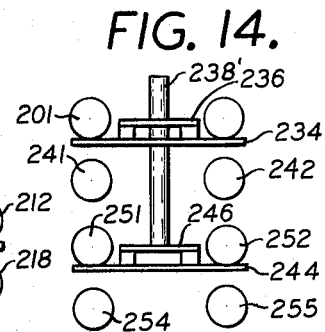
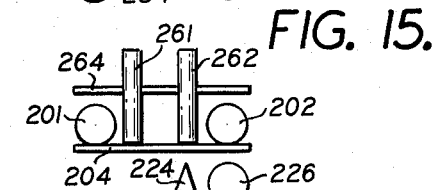
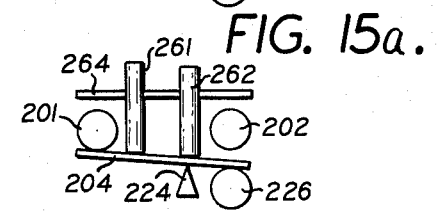
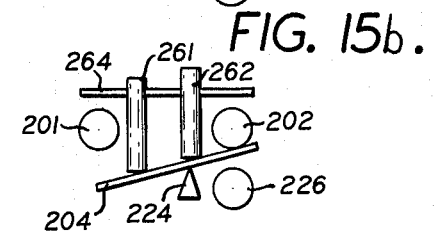
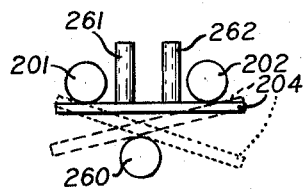

United States Patent Office 3,256,400
Patented June 14, 1966

3,256,400
MAGNETIC SWITCH
George Wintriss, Carversville, Pa., assignor to Industrionics Controls, Inc., New York, N.Y., a corporation of New York
Filed Oct. 10, 1962, Ser. No. 229,670
14 Claims. (Cl. 200—87)

This invention relates to electric switches and more especially to improvements in magnetic switches.

It is an object of the invention to provide a snap-action switch that has no pre-travel. Ordinarily, a portion of a switch moves and produces a stress that eventually causes a movable contact of the switch to snap into an open or closed position; but the extent of the pre-travel varies from one operation to another and this makes the switch unsuitable for certain uses, such as in control apparatus where it is important that the switch always operate when a particular part of the control apparatus moves into a definite position in its travel. In its broader aspects, therefore, it may be said that it is an object of the invention to provide an improved switch for use in electrical controls.

Another object is to provide an improved magnetic switch. In the use of magnets for holding movable switch contacts in position and for obtaining snap action of the switch, it has been the usual practice to have the magnet act on an arm or other actuator to which a movable contact of the switch is connected. This generally means that the arm or other actuator can not come into actual contact with the magnet unless the system is made resilient, because two different parts of a system can not be made to contact reliably with separate surfaces except by having the first one that contacts yield while the other moves into contact. This resilience not only results in the necessity for pre-travel, but it also impairs the snap action.

With this invention, the magnet that is used in the switch is preferably used as one of the electrical contacts of the switch so that actual contact can be made with the magnet and there is no other part that has to be considered, thus pre-travel is eliminated and better snap action is obtained.

Some other features of the invention relate to combinations of switch actuators and operating buttons which are made possible by the use of the magnetic electric contacts of this invention. One of these features involves a snap-action switch which is closed and opened by operation of a single push button, and there are various other switches, all of which are extremely simple in construction and convenient to manipulate.

Other objects, features and advantages of the invention will appear or be pointed out as the description proceeds.

In the drawing, forming a part hereof, in which like reference characters indicate corresponding parts in all the views:

FIGURE 1 is a diagrammatic sectional view showing an electric switch made in accordance with this invention;

FIGURE 2 is a modified form of the switch shown in FIGURE 1, the change being in the form of the magnets used;

FIGURES 3 and 4 are sectional views, on a reduced scale, taken on the lines 3—3 and 4—4, respectively, of FIGURE 1;

FIGURE 5 is a diagrammatic sectional view similar to FIGURE 1, but through another modified form of switch;

FIGURE 6 is another view similar to FIGURE 1 but showing a magnetic switch having spring operation;

FIGURE 7 is a diagrammatic view of a control system having a number of switches operated by a common actuator;

FIGURE 8 is a diagrammatic view showing a modified form of switch operated by a push button located beyond the center of the contact bar;

FIGURE 9 is a diagrammatic view showing a modification of the switch illustrated in FIGURE 8;

FIGURE 10 is a diagrammatic view showing a modification of the switch shown in FIGURE 9;

FIGURES 11, 11A and 11B are diagrammatic views showing still another modified form of switch, the different views showing the switch in different positions;

FIGURE 12 is a diagrammatic view showing a modification of the switch illustrated in FIGURE 5;

FIGURE 13 is a diagrammatic view showing another modified form of the invention in which the contact bar is maintained in a parallel position;

FIGURE 14 is a diagrammatic view showing a modification of the switch shown in FIGURE 13;

FIGURES 15, 15A and 15B are diagrammatic views of still another modified form of the invention, the different views showing the switch in different positions; and FIGURE 16 shows another type of two-button switch made in accordance with this invention.

FIGURE 1 shows a switch having a housing 20 with a side wall 22, a front plate 24 and a back plate 26. These are detachably connected together in any suitable manner. There are fixed contacts 28 carried by the back plate 26 and connected to terminals 30 that extend through the back plate. There are other fixed contacts 32 secured to conductor plates 34 by rivets 36, or in any other suitable manner. Each of these conductor plates 34 extends across a portion of the upper face of the side wall 22 and across an opening 37 in which there is a spring 38.

Each of the springs 38 is an electrical conductor and it is compressed between a plate 34 and another terminal 40 in the back plate 26.

The contacts 32 are preferably permanent magnets. There is a contact bar 42 in the housing; and this contact bar is normally held, by the magnet contacts 32, in the position illustrated in FIGURE 1. A plunger 44 has a button 46 at its upper end extending through an opening in the front plate 22. This plunger has an annular lip 46 at its lower end in position to rest on the contact bar 42.

When the plunger 44 is resting on the contact bar 42, and the contact bar is against the magnetic contacts 32, the switch is closed. When pressure is applied to the button 46, the force against the contact bar 42 increases until it is sufficient to overcome the attraction of the magnet contacts 32 for the contact bar 42. The contact bar 42 then moves away from the magnet contacts 32 and moves with a snap action which results from the rapid decrease in the magnetic attraction as the air gap between the magnet contacts 32 and the contact bar 42 increases. This produces a snap action. It should be noted that the breaking of the contact between the magnet contacts 32 and the contact bar 42 occurs without any pre-travel of the plunger 44. Since the contact bar 42 is the portion of the circuit between the magnet contacts 32, on opposite sides of the switch, the movement of this contact bar away from the magnet contacts opens the circuit.

If the terminals 30 are connected in a circuit, then movement of the contact bar 42 downward into position to touch the contacts 28 will close that circuit. In FIGURE 1 there are no external conductors connected to the terminals 30 and the switch is used only to open the circuit between the external contacts 51 and 52 which are connected to the terminals 40.

Whenever pressure on the button 46 is released, the magnet contacts 32 pull the contact bar 42 up again to close the circuit through the switch. This return movement of the contact bar 42 is a snap action because of the rapid rise in the magnetic attraction as the air gap shortens. Thus the switch shown in FIGURE 1 is of the momentary contact type and is always closed except when pressure is maintained on the button 42 to hold it down.

It will be evident that the switch shown in FIGURE 1 can be made a normally-open, momentary contact switch by connecting the conductors 51 and 52 with the terminals 30 instead of with the terminals 40. In this case, the magnets 32 are no longer the electric contacts of the circuit, but the mechanical operation is just the same. It will also be evident that the switch of FIGURE 1 can be modified by making the contact bar 42 a permanent magnet and having the contacts 32 merely made of ferrous material. In such a case, the contacts 28 must be non-ferrous in order to prevent the contact bar 42 from remaining in its lowered position after displacement by the plunger 44.

Although it is a feature of the invention that the magnets are the electrical contacts of the circuit, when the magnets hold the switch closed, and it is also a feature of the invention that the contact bar of the switch actually touches the magnets; this does not mean that the contact face of the magnet can not be plated with silver or some other non-ferrous material which is particularly well-suited for electric contacts. In such a case, the magnet is to be considered as of composite construction.

FIGURE 2 shows a modification of the construction shown in FIGURE 1. The only difference is the use of short bar magnets 54 of substantially cylindrical cross section with the axis of the cylinder extending parallel to the surface of the contact bar 42 instead of normal to that surface, as in the construction shown in FIGURE 1.

FIGURE 5 shows a switch having a housing 60 with a back plate 62 having a circumferential ridge 64 that forms the lower part of the side wall of the housing 60. The upper part of the side wall of the housing 60 is formed by an annular shield 66 located above the ridge 64 and separated from the ridge by an annulus 68. The housing 60 is closed at the top by a front plate 70.

There are magnet contacts 72 connected to conductor plates 74 by rivets 76. This construction is similar to that already described in FIGURE 1. A terminal 78 in the back plate 62 is electrically connected with the conductor plate 74 by a spring 80 compressed between the terminal 78 and the contact plate 34, as in FIGURE 1.

There is a floating frame 82 in the housing 60. This frame is urged away from the back plate 62 by springs 84. The floating frame 82 contacts with the inner edge of the annulus 68 to limit the extent to which the springs 84 can move the floating frame. There are magnet contacts 85 connected to the floating frame 82 by rivets 76.

The switch shown in FIGURE 5 has two plungers. It has a first plunger 86 which slides up and down in an opening through the front plate 70, and this plunger 86 has a lip 88 which contacts with a contact bar 90 to move the contact bar away from the magnet contacts 72 and into the contact with the magnet contacts 85. Both the breaking of the circuit with the magnet contacts 72 and the closing of the circuit across the magnet contacts 85 are by snap action.

There is an axial opening 92 through the plunger 86; and this axial opening 92 serves as a bearing for a second plunger 94 which extends downwardly into contact with the floating frame 82. The length of the plunger 94 is correlated with the other dimensions of the switch so that when the plunger 86 is moved inwardly far enough to displace the contact bar 90 away from the magnet contacts 72 and into contact with the lower magnet contacts 85, the second plunger 94 protrudes slightly above the face of the first plunger 86.

Because of the fact that the magnet contacts 85 are magnetic, they hold the contact bar 90 in its lowered position even after downward pressure on the plunger 86 is released. In order to bring the contact bar 90 back into its original position, shown in FIGURE 5, the second plunger 94 is depressed. This pushes the floating frame 82 downward, against the pressure of the springs 84, and causes the contact bar 90 to touch the upper edge of the annulus 68.

Since the annulus 68 prevents any further downward movement of the contact bar 90, further depression of the plunger 84 moves the magnet contacts 85 downward away from the contact bar 90 and causes the magnetic attraction of the magnet contacts 85 to decrease until it becomes less than that of the upper magnet contacts 72. When this occurs, the contact bar 90 is snapped upward by the magnetic contacts 72 to close the circuit across these upper magnet contacts 72 with a snap action.

FIGURE 6 shows a modified construction. The parts in FIGURE 6 which correspond to the construction of FIGURE 1 are indicated by the same reference characters with a prime appended. The plunger 44' differs from the plunger 44 of FIGURE 1 in that it has a lip 46' which is short and rolled inward to grip an upper convolution of a spring 96. This spring 96 holds the plunger 44' in its upward position. In the preferred construction, the spring 96 is not strong enough to break the circuit between the contact bar 42' and the magnet contacts 34'; and the plunger 44' is pushed downwardly until the lip 46' touches the contact bar 42' and pushes it away from the magnet contacts 34'.

FIGURE 7 shows three switches 101, 102 and 103, with plungers 105. All three of these switches are operated by a common actuator 106. This is possible because of the fact that the plungers 105 operate the switches without pre-travel.

FIGURE 8 shows a construction in which there are two magnets 201 and 202 with longitudinal axes extending horizontally. These magnets are contacts of electric circuits and there is a contact bar 204 which extends across the space between the magnets 201 and 202 and which forms a part of the electric circuit. The bar 204 is pushed downward by a plunger 206.

It will be understood that the contacts 201 and 202 are located in a housing and that the bar 204 has generally free floating movement in the housing, being guarded against excessive transverse displacement by the sides of the housing which act as guide surfaces. As in the case of the other bars, previously described, this limited transverse play keep the contacts clean in that there is some wiping action which results from the fact that the bar does not always touch the contacts at the same place.

There is an abutment 208 below the contact 202 and this abutment prevents the bar 204 from moving downwardly far enough to escape from the magnetic pull of the magnet contact 202. The plunger 206 is located closer to the magnet 202 than it is to the magnet 201 thus most of the force from the plunger 206 is exerted at the right-hand side of the bar 204 so that the bar pulls away from the magnet 202 before it pulls away from the magnet 201.

In the intended operation of the switch, the bar 204 never pulls away from the magnet 201 but the magnetic attraction of the magnet 201 of the bar 204 provides in effect a pivot connection on which the bar 204 can swing. This switch shown in FIGURE 8 is a momentary contact switch; that is, the circuit is broken when the plunger 206 is depressed but the circuit is re-established by attraction of the magnet contact 202 whenever the pressure on the plunger 206 is relieved.

FIGURE 9 shows a modification of the construction illustrated in FIGURE 8. In FIGURE 9 there is a magnet 211 located below a contact bar 204; and there is a magnet 212 located above the contact bar 204 at the end opposite to the magnet 211. A non-magnetic abutment 208 is located under the bar 204 as in FIGURE 8.

The bar 204 is actuated by a plunger 216 which is the same as the plunger 206 in FIGURE 8; but the plunger 216 can be located anywhere along the length of the bar 204 because the magnet 211 being on the opposite side of the bar from the plunger 216, can never have the bar 204 pushed away from it by pressure of the plunger 216.

This switch as shown in FIGURE 9 is a momentary contact switch in which the circuit is closed from the parts and the positions shown in FIGURE 9; the circuit is broken whenever the plunger 216 pushes the bar 204 downward away from the magnet contact 212. The abutment 208 prevents the bar 204 from moving out of the field of magnetic attraction of the magnet contact 212.

FIGURE 10 shows another modification which is similar to FIGURE 9 except that another magnet contact 218 is substituted for the non-magnetic contact 208 of FIGURE 9. FIGURE 10 is, therefore, a single pole double throw switch in that the contact 218 is one of the circuit contacts and the switch will remain closed with the bar 204 in contact with either the magnet contact 212 or the lower magnet contact 218. Since the bar 204 is held down by the magnet 218, it is necessary to have provisions for pulling the bar 204 upward again and this may be done by connecting it to the plunger 216 so that the plunger can pull the bar 204 up as well as push it down. If desired, two buttons can be used as will be explained in connection with some of the subsequent figures.

FIGURE 11 shows a construction which has magnet contacts 201 and 202 above a bar 204 and with the bar operated by a plunger 222. In this construction there is a fulcrum 224 located in the housing below the bar 204 and to the right of the plunger 222. When the bar 204 is in the position shown in FIGURE 11, the circuit is closed through the switch from the magnet contact 201 to the magnet contact 202.

When pressure is applied to the plunger 222, the bar 204 is pushed downwardly at its right end into contact with another magnet contact 226 located below the contact 202. Even though the plunger 222 is at the center of the bar 204, pressure of this plunger will move the bar away from the magnet 202 more easily than it moves it away from the magnet 201. This is because the magnet 226, located below the magnet 202 exerts a pull on the bar 204 and counteracts to some extent the attraction of the magnet 202 for the bar 204. There is no such compensation at the left-hand end of the bar 204 where the bar is held by the magnet 201.

Movement of the bar 204 into the position shown in FIGURE 11a closes the circuit through the switch from the contact 201 to the contact 226. It is a feature of the construction shown in FIGURE 11 that the fulcrum 224 is below or in any event not higher than the bar 204 when the bar is in contact with the magnets 201 and 226, as shown in FIGURE 11a. The right-hand end of the bar 204 moves from the magnet contact 202 to the magnet contact 226 with a snap action because of the sudden release from the attraction of the magnet 202 and the rapid build-up of the attraction of the magnet 226 of the air gap between the bar 204 and the magnet 226 diminishes. If the pressure of the plunger 222 is increased further, after the switch has snapped into the position shown in FIGURE 11a, the left-hand end of the bar 204 will move away from the magnet 201 and as the bar 204 moves downward, it touches the fulcrum 224 and rocks about this fulcrum into the position as shown in FIGURE 11b. This is the open position of the switch in which there is no circuit formed by the bar 204 between any of the contacts of the switch. The switch position shown in FIGURE 11b is a position in which the switch will not remain unless pressure is maintained on the plunger 222.

FIGURE 12 is a diagrammatic showing of a switch such as is illustrated in FIGURE 5, but with a short circular bar magnet, with the longitudinal axes extending horizontally, substituted for a magnet as shown in FIGURE 5, previously described. The upper magnets in FIGURE 12 are indicated by the reference characters 201 and 202, and the lower magnets by the reference characters 231 and 232. Other parts in FIGURE 12 are indicated by the same reference characters as in FIGURE 5.

FIGURE 13 shows another modification of the invention in which there are upper magnet contacts 201 and 202 above a bar 234 which is connected by a bracket 236 to a plunger 238. This plunger moves up and down in a bearing 240 which prevents any transverse tilting of the plunger and since the bar 234 is attached to the plunger 240 by the bracket 236, so that the parts move as a unit, the bar 234 can only move parallel to itself. There are abutments 241 and 242 located below the magnet contacts 201 and 202. These abutments 241 and 242 are not magnetic in the construction shown in FIGURE 13. If they are not in the circuit of the switch, when the switch of FIGURE 13 is closed then the bar 234 is in the position illustrated, and the switch is open when the bar 234 is pushed downwardly into contact with the abutments 241 and 242.

FIGURE 14 shows a construction which is similar to FIGURE 13 except that the switch is operated by a plunger 238' which is longer than the plunger 238 of FIGURE 13 and which extends downwardly below the bar 234 to another bar 244 which is attached to the plunger by a bracket 246. This is a rigid construction so that both bars 234 and 244 move as a unit with the plunger 238' and always move parallel to themselves and to each other. There are magnet contacts 251 and 252 above the bar 224; and there are abutments 254 and 255 located below the bar 244 and corresponding to the abutments 241 and 242 of the upper bar 234.

FIGURE 15 shows still another modification of the invention in which a bar 204 is held by the magnetic attraction of magnet contacts 201 and 202 when the switch is closed to establish a circuit between these contacts 201 and 202. This switch as shown in FIGURE 15 is operated by two plungers 261 and 262 extending through a face plate 264 of the switch housing.

There is another magnet contact 226 located below the contact 202 and there is a fulcrum 224 located below the bar 204 as in FIGURE 11.

The construction shown in FIGURE 15 differs from that of FIGURE 11 in that the switch is operated by the two plungers 261 and 262 in place of the single plunger of FIGURE 11. When the circuit between the contacts 201 and 202 is to be opened and then the circuit estblished between the contacts 201 and 226, the plunger 262 is pushed downward to move the bar 204 into the position shown in FIGURE 15a. When the switch is to be moved into an open position, the plunger 261 is operated to rock the bar 204 about the fulcrum 224 and shift the bar 204 into the position shown in FIGURE 15b.

With the parts in the position shown in FIGURE 15b, the plunger 262 touches the bar 204 a slight distance to the right of the fulcrum 224 so that the pressure of the plunger 262 against the bar 204 will rock the bar 204 and the fulcrum 224 at least far enough to bring the left-hand end of the bar 204 well within the field of attraction of the magnet 201 so that the bar 204 returns to the position shown in FIGURE 15, and returns with a snap action.

FIGURE 16 shows a switch having the two upper magnet contacts 201 and 202 that hold the contact bar 204 in the raised position shown in full lines. There is a magnet contact 260 below the bar 204 and spaced from the bar 204 when the bar is in this full line position.

Plungers 261 and 262 are located on opposite sides of the center magnet contact 260. Pressure on the plunger 261 moves the bar 204 away from the contact 201 and downward at its left hand end into position to touch the contact 260 as shown in dash lines in FIGURE 16. This establishes a circuit between the contacts 260 and 202, the operation being with a snap action as previously explained.

Pressure on the plunger 262 rocks the bar 204 from the position shown in dark lines to that shown in dotted lines; or from the position shown in full lines to that shown in dotted lines, to establish a circuit between contacts 260 and 202.

The preferred embodiment and a number of modifications of the invention have been illustrated and described, but changes and other modifications can be made and features of the invention can be used in different combinations without departing from the invention as defined in the claims.

What is claimed is:

1. An electric switch assembly including a housing, two fixed contacts in an electric circuit through the switch assembly and located within the housing, a bar in the housing, means guiding the bar for movement between a position where it touches both of the fixed contacts to close the circuit between them and a position in which it is spaced from at least one of the fixed contacts to open said circuit, the fixed contact that the bar moves away from being a magnet that normally holds the bar in contact by magnetic attraction, the guiding means for the bar leaving the bar freely mounted in the housing and angularly movable therein, and the guiding means including abutment surfaces that limit lateral movement of the bar but which are spaced from one another to provide some play for the bar transverse of the direction of movement of the bar toward and from the magnet contact, whereby the bar strikes the magnet contact in somewhat different positions at different times to obtain, in effect, a wiping action for keeping the touching surfaces clean.

2. The electric switch described in claim 1 characterized by a plunger that presses one of the contacts away from the other with a snap action resulting from rapid reduction of the attraction of the magnetic contact for the other contact as soon as the contacts begin to move apart, the bar having free angular movement in the plane of the plunger independent of the plunger.

3. The magnetic switch described in claim 2 characterized by the bar being a rigid element and the plunger contacting directly with said bar so as to break the circuit without pre-travel of the plunger.

4. The electric switch described in claim 3 characterized by a stop that limits movement of the bar away from the magnet to a distance less than the effective magnetic pull of the magnet so that the magnetic force pulls the bar and magnet together with a snap action when pressure on the plunger is released.

5. An electric switch including an electric circuit, two fixed contacts in the circuit, a movable contact comprising a bar which touches both of the fixed contacts to close the electric circuit between them, both of the fixed contacts being magnets, an actuator for the bar and with respect to which the bar is angularly movable, the magnets being of sufficient magnetic strength to hold the bar in firm contact with them by their own magnetism when the bar is not displaced by the actuator, and one of the magnets being of sufficient strength to hold the bar and to serve as a fulcrum for the bar when the actuator moves the bar angularly about that magnet and out of contact with the other magnet.

6. The electric switch described in claim 5 characterized by a switch housing, both of the magnet contacts being secured to the switch housing, the bar being movable in the housing, and a stop limiting movement of the bar away from the magnet to a distance that the magnet can pull the bar back into contact with itself by magnetic attraction.

7. An electric switch comprising a movable contact bar that moves through a stroke between a circuit-closing position and a circuit-opening position, a portion of said movable bar constituting a movable contact of the switch, a first bar magnet by which the bar is attracted toward one end of its stroke and against one side of which the bar abuts to limit the travel of the bar in one direction, the magnet being a contact of the switch and a part of the circuit that is closed and opened by movement of the bar and a second bar magnet on the other side of the bar from the first bar magnet and against which the bar comes in contact when it moves away from the first bar magnet.

8. An electric switch including a housing, a contact bar within the housing and free to move up and down, guide means for the bar including abutment surfaces on the housing limiting transverse movement of the bar but spaced from one another by a distance greater than the width and length of the bar so that the bar is free for limited transverse sliding movement, portions of the bar being electric contacts of the switch, abutment surfaces above and below the bar and with which the bar contacts for limiting its up and down movement, some of the abutment surfaces being contacts of the electric circuit of the switch, and some of the contacts of the switch being permanent magnets.

9. The electric switch described in claim 8 characterized by end portions of the bar being movable contacts of the switch, and the other contacts that are magnets being located in position to be touched by said end portions to close the circuit.

10. The electric switch described in claim 9 characterized by different magnets at different end portions of the bar, and an operating plunger that contacts with the bar between the magnets and at a location along the length of the bar closer to one end magnet than to the other.

11. The electric switch described in claim 8 characterized by both of the magnet contacts being above the contact bar and the plunger also being above the contact bar and in contact therewith.

12. The electric switch assembly described in claim 1 characterized by a third switch contact which makes the switch a double throw switch, one of the first two fixed contacts being a fulcrum about which the bar moves away from the other of said first two fixed contacts and constituting a magnet below one end of the bar and against which the bar is held by magnetic attraction, the two other electric contacts being at the other end of the bar, one below the bar and the other above the bar, said other electric contact that is below the bar being at a location along the bar that is opposite the upper of said other electric contacts.

13. An electric switch including a contact bar held at one end by a magnet that serves as a first fulcrum for the bar, said magnet and the bar being part of the electric circuit of the switch, a pair of other electric contacts in the switch circuit including magnets, one located above the bar and the other located below the bar, said pair being near the end of the bar remote from said first fulcrum, a plunger at an intermediate location above the bar between the first fulcrum and the pair of other electric contacts, and a second fulcrum below the bar and at a location lengthwise of the bar between the plunger and said pair of other electric contacts, the second fulcrum being below the position of the bar when it is in contact with the first fulcrum and the lower of said other electric contacts.

14. An electric switch including a contact bar with end portions that constitute electric contacts of the circuit of the switch, two electric contacts above the bar and each of which is adjacent to a different end portion of the bar, each of said two electric contacts being a magnet, another magnet electric contact below the upper electric contact at one end of the bar, two plungers at spaced locations along the length of the bar and between the two upper electric contacts, and a fulcrum under the bar and nearer to the end of the bar having the electric contacts both above and below the bar, said fulcrum being at least as low as the lower side of the bar when the bar is in contact with the lower electric contact at one end and with the upper electric contact at the other end of the bar, one of the plungers contacting with the bar beyond the fulcrum on the side of the fulcrum away from the end of the bar that has electric contacts both above and below it.

References Cited by the Examiner

UNITED STATES PATENTS

| | | | |
|---|---|---|---|
| 2,234,982 | 3/1941 | Ross | 200—87 |
| 2,467,720 | 4/1949 | Austin | 317—172 |
| 2,573,920 | 11/1951 | McLeod | 200—87 |
| 2,847,528 | 8/1958 | Combs | 200—67 |
| 2,926,227 | 2/1960 | Sundt | 200—97 |
| 2,971,068 | 2/1961 | Wegner | 200—67 |
| 3,052,778 | 9/1962 | Kathe | 200—87 |
| 3,056,000 | 9/1962 | Lucas. | |
| 3,169,345 | 2/1965 | Marmo et al. | 46—241 |

FOREIGN PATENTS 1,170,795  1/1959  France.

OTHER REFERENCES

German application 1,135,100, Aug. 23, 1962.

BERNARD A. GILHEANY, *Primary Examiner.*

ROBERT K. SCHAEFER, E. JAMES SAX, *Examiners.*

B. DOBECK, *Assistant Examiner.*